April 28, 1953  P. LEONARD  2,636,418
REAR VISION MIRROR SUPPORT FOR TRACTORS
Filed Oct. 2, 1950
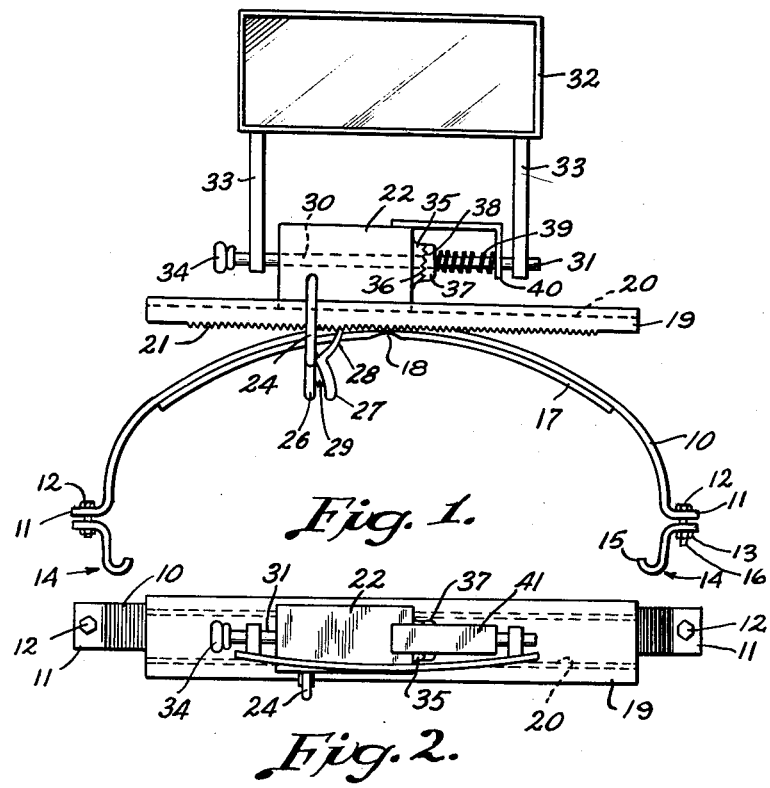
Fig. 1.
Fig. 2.
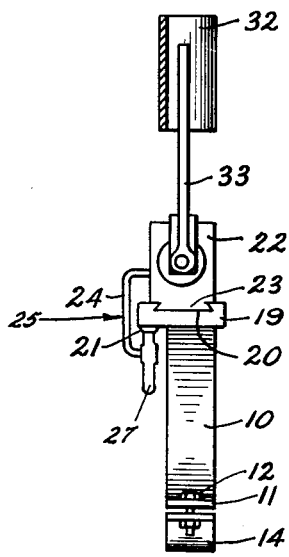
Fig. 3.
INVENTOR
PERRY LEONARD
BY Munn, Liddy & Glaccum
ATTORNEYS Patented Apr. 28, 1953

2,636,418

UNITED STATES PATENT OFFICE 2,636,418

REAR VISION MIRROR SUPPORT FOR TRACTORS

Perry Leonard, Effingham, Kans.

Application October 2, 1950, Serial No. 188,024

9 Claims. (Cl. 88—98)

This invention relates to mirror supports and more particularly to a device for removably mounting a rear vision mirror on farm and construction equipment especially tractors.

An object of the invention is to provide a simple mirror holding assembly which may be clamped across the hood of a tractor or other vehicle and having a horizontal track member extending transversely of said hood to provide a means for adjustably supporting a rear vision mirror. The mirror may be moved laterally to a preferred position permitting proper vision to the rear without the necessity of the operator turning himself around.

Another object of my invention is the provision of a means for securing the mirror in a selected lateral position on the hood of the vehicle, this securing means likewise affording convenient and quick release of the mirror when readjustment is desired.

A further object of the invention is to incorporate into the above mentioned structure a second and independent adjustment feature which will enable the operator to control the angular elevation of the mirror to best cover the terrain to the rear of the vehicle.

These and other objects and advantages will become apparent from the following description of the present invention illustrated in the accompanying drawing, in which:

Figure 1 is an elevation view of the device as viewed from the operator's position;

Figure 2 is a plan view of the invention;

Figure 3 is a side elevation view of the invention.

Similar reference characters represent similar parts in the several figures.

While the adaptation of rear vision mirrors to passenger car and trucks has been accomplished with little difficulty, the mechanical problems and working requirements inherent in the use of heavy duty equipment such as farm tractors have hampered the effective use of mirrors on such vehicles. As a result the tractor operator may be constantly seen covering two opposite fields of vision by continually turning or twisting his head or body from front to rear as he operates his equipment. The disadvantages and objections to this infinitely repeated physical movement is apparent. In many instances the terrain is such that it requires the full attention of the driver to the front and minor accidents frequently occur while the driver is facing the rear of the vehicle. Furthermore a stiff neck or wrenched back is not uncommon after sustained farm work of this type.

With the above in mind I have devised a mirror support which for the first time provides the industry with a means which will enable a tractor operator to completely view the terrain to the rear without altering his normal driving position. Referring to Figure 1 of the drawing it will be seen that the base element of my mirror support assembly consists of an arcuate metal strap 10 of an inverted U-shape which is adapted to conform to the curvature of the tractor hood. Each end of strap 10 is formed with an outwardly extending flange 11 having a vertical aperture therein to receive a bolt 12. Bolt 12 also penetrates a horizontal flange 13 of a clamping bracket designated as 14 and having an inwardly extending hook end 15. Hook 15 is intended to fit beneath the lower edge of the tractor hood and by rotation of a nut 16 at each side of the vehicle slack may be taken up to rigidly anchor straps 10 to the surface of the hood.

In order to prevent either rattling of the assembly or damage to the hood paint, I prefer to attach a strip 17 of hard rubber material to the inner surface of the attaching strap 10. Furthermore to permit easy installation on differently constructed tractors the inner surface of strap 10 may be provided with an arcuate recess 18 which will bridge a steering rod located on top of the hood as in some tractor designs.

As best seen in Figure 1 the summit of the arcuate strap member 10 has fixed thereto by means of welding or the like, a transversal horizontal bar 19 which extends substantially across the width of the tractor hood. Bar 19 is basically rectangular in cross section (see Fig. 3) and has formed in the upper surface thereof a dove-tail groove 19. The lower surface of bar 20 is provided with a rack-like arrangement of depending teeth 21 located along that edge of the bar toward the driver's seat.

A traveling block 22 is supported on bar 19, and is formed with a dove-tail projection 23 along the lower surface thereof. This projection engages the mating groove 20 in bar 19 to slidably interlock block 22 and the bar. Thus it will be apparent that the traveling block 22 may be positioned at any desired point between the ends of the transverse bar. In order to assure ease of adjustment of the block a substantially free fit of the dove-tail connection is essential. At the same time jarring of the vehicle makes it necessary to provide means for clamping block 22 in a selected position. Therefore, I secure one end of a U-shaped portion 24 of bracket 25 to the front face of the block. The lower end of the bracket is provided with a depending handle 26 which cooperates with a bell crank lever 27 to form a hand grip to engage and release a holding pawl end 28 from the rack 21. A spring 29 provides the necessary biasing force to retain pawl 28 in place until the hand release is squeezed by the operator prior to lateral shifting of the mirror.

Block 22 has a longitudinal aperture 30 extending therethrough which is adapted to receive a horizontal shaft 31. This shaft is freely movable within block 22 and acts as a pivotal axis for the supported mirror 32 rigidly connected to opposite ends of shaft 31 by posts 33. The mirror is preferably from eight to twelve inches long and has a convex reflecting surface in order to cover a greater range of vision behind the tractor. A small turning knob 34 is carried by one end of the shaft for convenience in angular adjustment of the mirror about the axis of shaft 31.

It is of course obvious that movement of the vehicle over rough terrain would soon jar the mirror out of its selected angular adjustment and that some easily operated means for retaining the mirror in said adjustment is desirable. For this purpose I provide one end of block 22 with a circular boss 35 surrounding the mouth of the block aperture 30 and having teeth 36 formed on its exposed face. A circular disc 37 fits over shaft 31 and is rigidly secured to the shaft. This disc has one face formed with a ring of teeth 38 for engagement with complementary teeth 36 on the supporting block 22.

In order to normally retain the above mentioned set of locking teeth in engagement, I include in the assembly a helical spring 39 threaded on shaft 31 and extending between disc 37 and a depending arm 40 of an abutment bracket 41 projecting from the end of block 22. Since the spring is under compression, it tends to urge disc 37 to the left as viewed in Figure 1 and thus lock the sets of teeth 36 and 38 in mutual engagement. When the shaft 31 is manually shifted to the right the above mentioned teeth disengage and the shaft together with mirror 32 may be rotated for adjustment.

In the operation of the invention the transverse supporting bar is firmly secured to the hood of a tractor by means of the clamping strap 10. When the operator desires to shift the mirror to the left or right for better vision he merely has to reach forward with one hand and squeeze the hand grip releasing mechanism 27 and the spring biased pawl will disengage from teeth 21 enabling block 22 to slide freely in its dovetail guide track. Furthermore if the vertical adjustment of the mirror needs improvement the operator can simply depress knob 34 causing disengagement of the locking teeth 36 and 38 whereby rotation of the knob can position the vertical inclination of the mirror as desired.

From the foregoing description of the present invention it will be seen that I have devised a novel supporting means for mirrors to be used on a farm tractor and which enables complete adjustment of the mirror to fit the various requirements of this type of work. This dual adjustment is far more effective than a mere universal joint type of adjustment commonly used for rear vision mirrors. Regardless of which side of the tractor the operation is working from, the mirror can be laterally shifted to cover the area to be viewed.

While I have shown and described a preferred form of my invention, it will be understood that variations in details of form may be made without departure from the invention as defined in the appended claims.

I claim:

1. A rear vision device for use on farm machinery comprising a clamping member adapted to be secured to the hood of said machinery, a horizontal bar fixed to said member and adapted to extend transversely of the hood, a block supported on said bar and movable longitudinally thereon, means connecting said bar and said block for selective positioning of the movable block along the longitudinal axis of the bar, said movable block having a horizontal aperture therethrough, a rod freely received by said aperture, a mirror secured to said rod whereby rotation of the rod within said aperture will regulate vertical inclination of the mirror.

2. A rear vision device for use on farm machinery comprising a clamping member adapted to be secured to the hood of said machinery, a horizontal bar fixed to said member and adapted to extend transversely of the hood, a block supported on said bar and movable longitudinally thereon, means connecting said bar and said block for selective positioning of the movable block along the longitudinal axis of the bar, said movable block having a horizontal aperture therethrough, a rod freely received by said aperture, a mirror secured to said rod whereby rotation of the rod within said aperture will regulate vertical inclination of the mirror, and means for retaining the mirror in a selected position.

3. A rear vision device for use on farm machinery comprising a clamping member adapted to be secured to the hood of said machinery, a horizontal bar fixed to said member and adapted to extend transversely of the hood, said bar having a longitudinal slot therein, a movable member supported on said bar and having a projection thereon in movable engagement with said slot for guiding said movable member along the bar, said movable member having a horizontal aperture therethrough, a rod freely received by said aperture, a mirror secured to said rod whereby rotation of the rod will regulate vertical inclination of the mirror, and means for retaining the mirror in a selected position.

4. A rear vision device for us on farm machinery comprising a clamping member adapted to be secured to the hood of said machinery, a horizontal bar fixed to said member and adapted to extend transversely of the hood, said bar having a longitudinal slot therein, a movable member supported on said bar and having a projection thereon in movable engagement with said slot for guiding said movable member along the bar, said movable member having a horizontal aperture therethrough, a rod freely received by said aperture, a mirror secured to said rod whereby rotation of the rod will regulate vertical inclination of the mirror, teeth formed on said movable member, a lock member fixed to said rod and having teeth thereon adapted to engage with the teeth on said movable member to prevent rotation of the rod in said aperture and means normally biasing the projections into engagement.

5. A rear vision device for use on farm machinery comprising a clamping member adapted to be secured to the hood of said machinery, a horizontal bar fixed to said member and extending transversely of the hood, said bar having a longitudinal slot therein, a movable member having a projection thereon for engagement with said slot for guiding said movable member along the bar, said movable member having a horizontal aperture therethrough, a rod freely received by said aperture, a mirror secured to said rod whereby rotation of the rod will regulate vertical inclination of the mirror, projecting teeth surrounding the opening of said aperture in one end of the movable member, a lock member fixed to the rod and having teeth surrounding said rod and adapted to engage with the first mentioned teeth to lock the rod against rotation, spring means normally urging said locking teeth into engagement, said rod being slidable in said aperture against the spring means for release of the teeth whereby the rod and mirror may be rotated.

6. A rear vision device for use on farm machinery comprising a clamping member adapted to be secured to the hood of said machinery, a horizontal bar fixed to said member and extending transversely of the hood, said bar having a longitudinal slot therein, a movable member having a projection thereon for engagement with said slot for guiding said movable member along said bar, a toothed rack formed along one face of the bar, a spring biased clamp carried by the movable member and adapted to engage said rack for locking said movable member at a selected point along said bar, said movable member having a horizontal aperture therethrough, a rod freely received by said aperture, a mirror secured to said rod whereby rotation of the rod will regulate vertical inclination of the mirror.

7. A rear vision device for use on farm machinery comprising a clamping member adapted to be secured to the hood of said machinery, a horizontal bar fixed to said member and extending transversely of the hood, said bar having a longitudinal slot therein, a movable member having a projection thereon for engagement with said slot for guiding said movable member along said bar, a toothed rack formed along one face of the bar, a spring biased clamp carried by the movable member and adapted to engage said rack for locking said movable member at a selected point along said bar, a hand grip for releasing engagement of said clamp, said movable member having a horizontal aperture therethrough, a rod freely received by said aperture, a mirror secured to said rod whereby rotation of the rod will regulate vertical inclination of the mirror.

8. A rear vision device for use on farm machinery comprising a clamping member adapted to be secured to the hood of said machinery, a horizontal bar fixed to said member and extending transversely of the hood, said bar having a longitudinal slot therein, a movable member having a projection thereon for engagement with said slot for guiding said movable member along the bar, a toothed rack formed along one face of the bar, a spring biased clamp carried by the movable member and adapted to engage said rack for locking said movable member at a selected point along said bar, a hand grip for releasing engagement of said clamp, said movable member having a horizontal aperture therethrough, a rod freely received by said aperture, a mirror secured to said rod whereby rotation of the rod will regulate vertical inclination of the mirror, teeth on said movable member, a lock member fixed to said rod and having teeth thereon adapted to engage with the first mentioned teeth to prevent rotation of the rod in said aperture and means normally biasing the projections into engagement.

9. A rear vision device for use on farm machinery comprising a clamping member adapted to be secured to the hood of said machinery, a horizontal bar fixed to said member and extending transversely of the hood, said bar having a longitudinal slot therein, a movable member having a projection thereon for engagement with said slot for guiding said movable member along the bar, a toothed rack formed along one face of the bar, a spring biased clamp carried by the movable member and adapted to engage said rack for locking said movable member at a selected point along said bar, a hand grip for releasing engagement of said clamp, projecting locking teeth surrounding the opening of said aperture in one end of the movable member and fixed to said movable member, a rod pivotally mounted in said aperture, a mirror mounted on said rod, a lock member fixed to the rod and having locking teeth surrounding said rod and adapted to engage with the first mentioned teeth to lock the rod against rotation, spring means normally urging said locking teeth into engagement, said rod being slidable in said aperture against the spring means for disengagement of the teeth whereby the rod and mirror may be rotated.

PERRY LEONARD.

References Cited in the file of this patent

UNITED STATES PATENTS

| Number | Name | Date |
| --- | --- | --- |
| 881,771 | Cain | Mar. 10, 1908 |
| 1,275,974 | Mosher | Aug. 13, 1918 |
| 1,345,018 | MacFarland | June 29, 1920 |
| 1,493,250 | Drummond | May 6, 1924 |
| 1,525,043 | Primrose | Feb. 3, 1925 |
| 1,651,896 | Hodny | Dec. 6, 1927 |
| 2,047,325 | Jones | July 14, 1936 |
| 2,486,105 | Bonar | Oct. 25, 1949 |
| 2,533,475 | Koonter | Dec. 12, 1950 |
| 2,573,443 | Holland | Oct. 30, 1951 |

FOREIGN PATENTS

| Number | Country | Date |
| --- | --- | --- |
| 723,506 | France | Jan. 18, 1932 |